United States Patent
Li et al.

(10) Patent No.: US 10,215,971 B2
(45) Date of Patent: Feb. 26, 2019

(54) FAR INFRARED IMAGING LENS SET, OBJECTIVE LENS AND DETECTOR

(71) Applicant: HAN'S LASER TECHNOLOGY INDUSTRY GROUP CO., LTD., Shenzhen, Guangdong (CN)

(72) Inventors: Jiaying Li, Guangdong (CN); Chaoming Zhou, Guangdong (CN); Bo Sun, Guangdong (CN); Yunfeng Gao, Guangdong (CN)

(73) Assignee: HAN'S LASER TECHNOLOGY INDUSTRY GROUP CO., LTD., Shenzhen, Guangdong (CN)

( * ) Notice: Subject to any disclaimer, the term of this patent is extended or adjusted under 35 U.S.C. 154(b) by 116 days.

(21) Appl. No.: 15/324,039

(22) PCT Filed: Aug. 7, 2014

(86) PCT No.: PCT/CN2014/083866
§ 371 (c)(1),
(2) Date: Jan. 5, 2017

(87) PCT Pub. No.: WO2016/019539
PCT Pub. Date: Feb. 11, 2016

(65) Prior Publication Data
US 2017/0205607 A1    Jul. 20, 2017

(51) Int. Cl.
*G01J 5/08* (2006.01)
*G01J 5/20* (2006.01)
(Continued)

(52) U.S. Cl.
CPC ............ *G02B 13/14* (2013.01); *G01J 5/0806* (2013.01); *G01J 5/20* (2013.01); *G02B 7/021* (2013.01); *G02B 9/04* (2013.01); *G02B 9/06* (2013.01)

(58) Field of Classification Search
CPC .......... G02B 13/14; G02B 7/021; G02B 9/04; G01J 5/0806; G01J 5/20
See application file for complete search history.

(56) References Cited

U.S. PATENT DOCUMENTS 2,855,824 A * 10/1958 Schade .................. G02B 13/04
                                                  359/663
4,397,520 A *  8/1983 Neil ........................ G02B 1/00
                                                  359/354
(Continued)

FOREIGN PATENT DOCUMENTS

CN    101937124    1/2011
CN    102466861    5/2012
(Continued)

OTHER PUBLICATIONS

International Search Report issued in PCT/CN2014/083866, dated Apr. 29, 2015, 6 pages.

*Primary Examiner* — David P Porta
*Assistant Examiner* — Djura Malevic
(74) *Attorney, Agent, or Firm* — Hamre, Schumann, Mueller & Larson, P.C.

(57) ABSTRACT

A far infrared detector and objective lens and lens set thereof. The far infrared imaging lens set (10) comprises a first lens (100) and a second lens (200) arranged in sequence along a principal axis; the first lens (100) has a first curved surface (102) having a radius of curvature of 2.4×(1±5%) mm and a second curved surface (104) having a radius of curvature of 2×(1±5%) mm; the second lens (200) has a third curved surface (202) having a radius of curvature of 50× (1±5%) mm and a fourth curved surface (204) having a radius of curvature of 60×(1±5%) mm; wherein the first curved surface (102), the second curved surface (104), the third curved surface (202), and the fourth curved surface (204) are arranged in sequence; the first curved surface
(Continued)

(102), the second curved surface (104) and the third curved surface (202) are all convex to the object side, and the fourth curved surface is convex to the image side. Distant targets can be detected in dark and foggy environments, and imaging capability is high.

9 Claims, 4 Drawing Sheets

(51) Int. Cl.
G02B 13/14 (2006.01)
G02B 9/06 (2006.01)
G02B 7/02 (2006.01)
G02B 9/04 (2006.01)

(56) References Cited

U.S. PATENT DOCUMENTS

| | | | | | |
|---|---|---|---|---|---|
| 4,411,488 | A | * | 10/1983 | Neil | G02B 23/00 359/354 |
| 4,494,819 | A | * | 1/1985 | Lidwell | G02B 13/14 359/356 |
| 4,537,464 | A | * | 8/1985 | Boutellier | G02B 13/14 250/351 |
| 4,802,717 | A | * | 2/1989 | Kebo | G02B 13/14 359/354 |
| 4,834,472 | A | * | 5/1989 | Palmer | G02B 13/14 359/356 |
| 5,121,255 | A | * | 6/1992 | Hayashi | G02B 21/04 359/355 |
| 5,202,792 | A | * | 4/1993 | Rollin | G02B 13/14 359/356 |
| 5,214,532 | A | * | 5/1993 | Hall | G02B 13/14 359/356 |
| 5,251,063 | A | * | 10/1993 | Baumann | G02B 9/16 359/355 |
| 5,504,628 | A | * | 4/1996 | Borchard | G02B 13/14 359/365 |
| 5,796,514 | A | * | 8/1998 | Chipper | G02B 13/14 359/354 |
| 5,940,224 | A | * | 8/1999 | Zhang | G02B 13/146 359/350 |
| 5,978,132 | A | * | 11/1999 | Ulrich | G02B 13/14 359/355 |
| 6,297,860 | B1 | * | 10/2001 | Moskovich | G02B 13/16 348/781 |
| 6,424,460 | B1 | * | 7/2002 | Kirkham | G02B 7/028 359/353 |
| 6,999,243 | B2 | * | 2/2006 | Chipper | G02B 13/14 359/354 |
| 7,672,045 | B2 | * | 3/2010 | Baker | G02B 9/04 356/247 |
| 7,738,169 | B2 | * | 6/2010 | Izumi | G02B 13/14 359/356 |
| 7,859,747 | B2 | * | 12/2010 | Hiraiwa | G02B 13/14 359/356 |
| 8,116,013 | B2 | * | 2/2012 | Yoshida | G02B 9/60 359/714 |
| 8,369,008 | B2 | * | 2/2013 | Forestier | G02B 13/146 359/353 |
| 8,553,320 | B2 | * | 10/2013 | Saito | G02B 1/04 359/357 |
| 8,643,944 | B2 | * | 2/2014 | Ando | G02B 9/34 359/356 |
| 2004/0201900 | A1 | * | 10/2004 | Kurata | G02B 21/02 359/660 |
| 2005/0036217 | A1 | * | 2/2005 | Nozawa | G02B 13/003 359/793 |
| 2006/0152824 | A1 | * | 7/2006 | Sun | G02B 5/208 359/785 |
| 2009/0067041 | A1 | * | 3/2009 | Izumi | G02B 13/14 359/356 |
| 2009/0168153 | A1 | * | 7/2009 | Hiraiwa | G02B 13/14 359/356 |
| 2010/0232013 | A1 | * | 9/2010 | Yin | G02B 13/0035 359/356 |
| 2011/0316969 | A1 | * | 12/2011 | Hsieh | G02B 13/06 348/36 |
| 2012/0113504 | A1 | * | 5/2012 | Tanami | G02B 5/1814 359/356 |
| 2012/0229892 | A1 | * | 9/2012 | Kang | G02B 9/10 359/356 |
| 2013/0271852 | A1 | * | 10/2013 | Schuster | G02B 9/06 359/717 |
| 2014/0063596 | A1 | * | 3/2014 | Jung | G02B 13/0045 359/357 |
| 2016/0116709 | A1 | * | 4/2016 | Lee | G02B 13/004 359/715 |
| 2016/0187625 | A1 | * | 6/2016 | Lin | G02B 13/06 359/357 |
| 2018/0157012 | A1 | * | 6/2018 | Jin | G02B 13/14 |

FOREIGN PATENT DOCUMENTS

| | | |
|---|---|---|
| CN | 102778747 | 11/2012 |
| CN | 103299228 | 9/2013 |
| JP | 2006235139 | 9/2006 |
| TW | M320680 | 10/2007 |

* cited by examiner

FAR INFRARED IMAGING LENS SET, OBJECTIVE LENS AND DETECTOR

FIELD OF THE INVENTION

The present disclosure relates to the field of optics, and more particularly relates to a far infrared imaging lens group, a far infrared imaging objective lens, and a far infrared imaging detector.

BACKGROUND OF THE INVENTION

The detectors used in the conventional surveillance system are mostly of "active detection", such as "visible light", "infrared light", "ultraviolet light" and the like, which belongs to "active" system and the layout of the surveillance system is very difficult. Monitoring the target using the characteristics of ultra-infrared light emitted by the target itself can reduce the complexity of the entire surveillance system. In case of poor penetration of visible light source, such as encountering smoke, haze, all black at night, only the ultra-infrared light (heat) can be detected, thus this technology can be widely applied to occasions, such as fire control, anti-theft at night and the like. Far-infrared monitoring typically involves the use of a temperature difference between the radiation source and the environment to find the monitoring target, therefore the infrared imaging capability and temperature resolution of the far-infrared system is very important.

SUMMARY OF THE INVENTION

Accordingly, it is necessary to provide a far infrared imaging lens group with a better imaging ability.

In addition, it is also necessary to provide a far infrared imaging objective lens, and a far infrared imaging detector.

A far infrared imaging lens group includes a first lens and a second lens arranged in sequence along a principal axis, wherein the first lens comprises a first surface and a second surface, the first surface has a radius of curvature of 2.4×(1±5%) mm and the second surface having a radius of curvature of 2×(1±5%) mm;

the second lens comprises a third surface and a fourth surface, the third surface has a radius of curvature of 50×(1±5%) mm and the fourth surface having a radius of curvature of 60×(1±5%) mm;

wherein the first surface, the second surface, the third surface, and the fourth surface are successively arranged; the first surface, the second surface, and the third surface are convex surfaces facing an object side, the fourth surface is a convex surface facing an image side.

In one embodiment, an interval between the second surface and the third surface is 1×(1±5%) mm.

In one embodiment, a central thickness of the first lens is 0.8×(1±5%) mm.

In one embodiment, a central thickness of the second lens is 0.8×(1±5%) mm.

In one embodiment, the first lens and the second lens are made of ZnSe.

A far infrared imaging objective lens includes a barrel and a lens group described above, wherein the barrel is configured to accommodate the lens group.

In one embodiment, the barrel has a length of 5.8 mm.

A far infrared detector includes the far infrared imaging objective lens and a thermal receiver, wherein the thermal receiver is located at a focus of the objective lens.

In one embodiment, the thermal receiver is a thermistor of "Hg.Cd.Te" of ¼".

The foregoing far infrared detector, objective lens, and lens group thereof can detect distant targets in the night, fog and other environments, thus they possess a higher imaging capability.

DETAILED DESCRIPTION OF THE EMBODIMENTS

Figure 1:
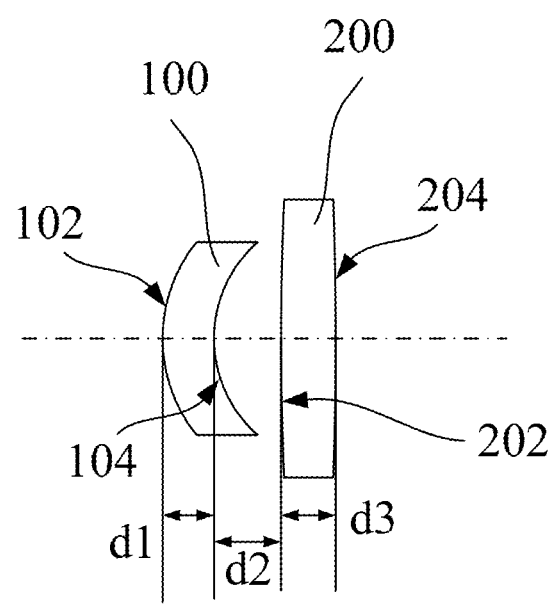
FIG. 1 is a schematic diagram of a lens group according to one embodiment.

FIG. 1 shows an arrangement of a far infrared imaging lens group according to one embodiment. The far infrared imaging lens group 10 includes a first lens 100 and a second lens 20 arranged in sequence along a principal axis. The first lens 100 is a meniscus convex lens, and the second lens 200 is a biconvex lens. The principal axis of the lens is an axis extending a center of the lens and is perpendicular to the lens. The principal axis of the first lens 100 coincides with the principal axis of the second lens 200.

The lens group 10 is mainly used to detect far infrared light, especially with a wavelength of 10.64 nm. In FIG. 1, the left side is the object side, and the right side is the image side. The light emitted from the far infrared light source is incident from the object side and is clearly imaged on the focal plane of the image side of the lens group.

Specifically, the first lens 100 has a first surface 102 and a second surface 104. The first surface 102 is a convex surface facing the object side, the second surface 104 is concave with respect to the first surface 102, i.e., the second surface 104 is a convex surface facing the object side. The first surface 102 has a radius of curvature of 2.4×(1±5%) mm and the second surface 104 has a radius of curvature of 2×(1±5%) mm. The first lens 100 has a central thickness (i.e., a thickness of the first lens 100 along the principal axis) of 0.8×(1±5%) mm. The first lens 100 can be made of ZnSe.

The second lens 200 has a third surface 202 and a fourth surface 204. The third surface 202 is a convex surface facing the object side, the fourth surface 204 is a convex surface facing the image side. The third surface 202 has a radius of curvature of 50×(1±5%) mm and the fourth surface 204 having a radius of curvature of 60×(1±5%) mm. The second lens 200 has a central thickness (i.e., a thickness of the second lens 200 along the principal axis) of 0.8×(1±5%) mm. The second lens 200 can be made of ZnSe.

Further, an interval between the second surface 104 and the third surface 202 is 1×(1±5%) mm.

In a preferable embodiment, the size and the position relationship of each lens can be illustrated below, in which the tolerance range of the size can be ±5%.

The lens 100:
The surface 102, radius of curvature of 2.4 mm;
The surface 104, radius of curvature of 2 mm;
The central thickness, 0.8 mm;
The material: ZnSe;
The lens 200:

The surface 202, radius of curvature of 50 mm;

The surface 204, radius of curvature of −60 mm (convex towards the image side);

The central thickness, 0.8 mm;

The material: ZnSe;

The distance between the surface 104 of the lens 100 and the surface 202 of the lens 200, 1 mm.

The wavelength of the light for the lens group, λ=10.64 mm.

Overall focal length, f'=4 mm;

D/f=1:1.5;

2ω=53°.

Figure 2:
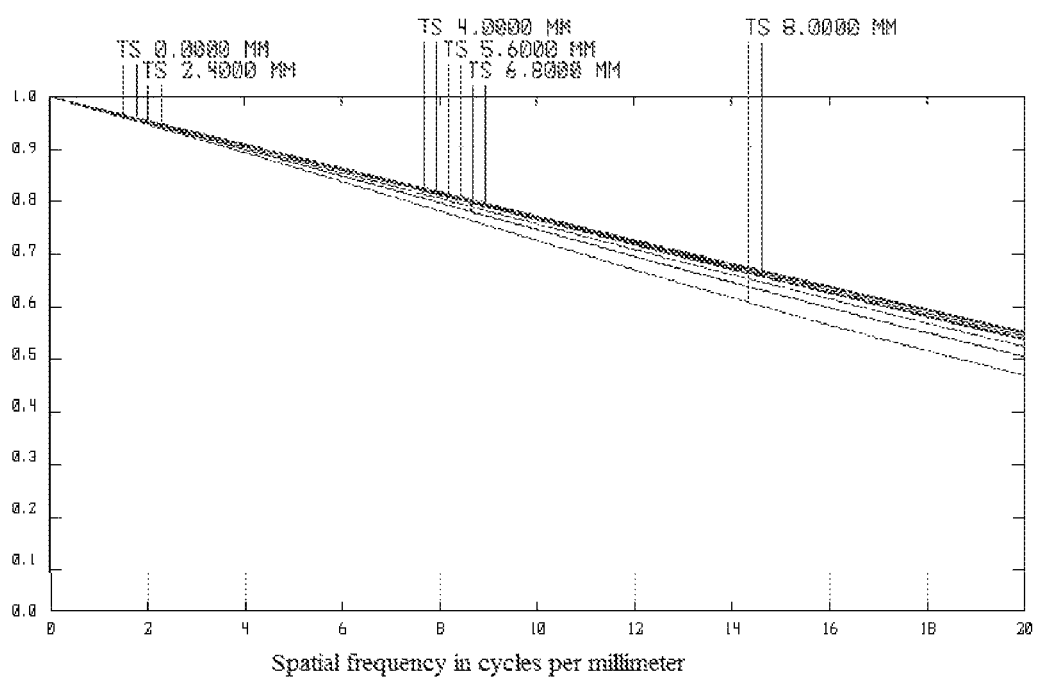
FIG. 2 is a graphic diagram showing a modulation transfer function of the lens group of FIG. 1.
Figure 3:
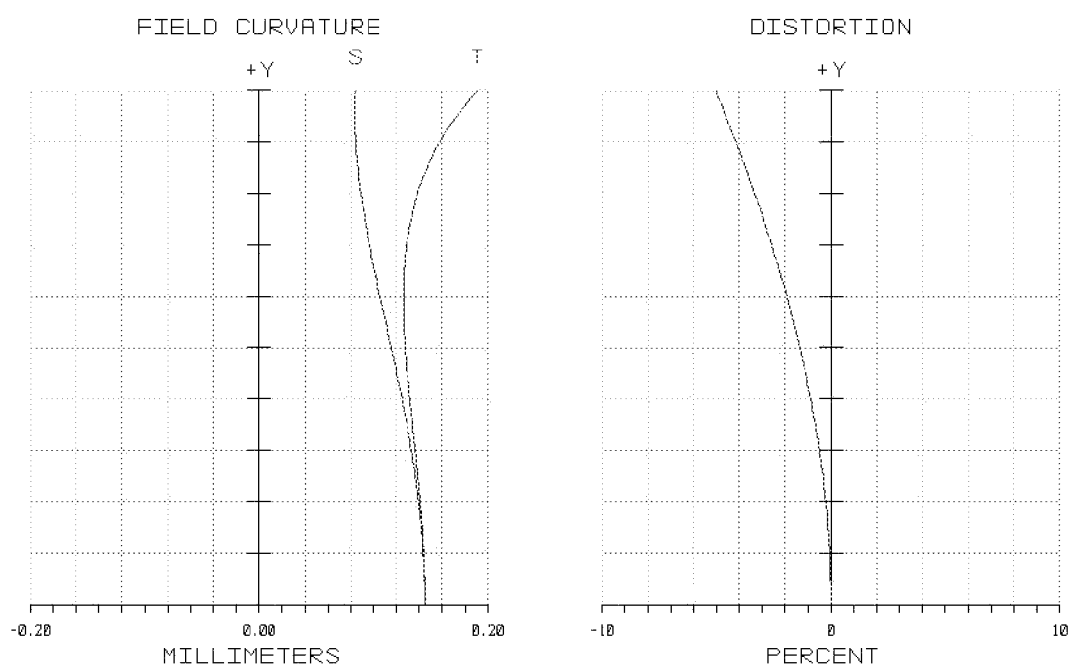
FIG. 3 is a graphic diagram showing field curvature and distortion of the lens group of FIG. 1.

FIG. 2 is a graphic diagram showing a modulation transfer function (M.T.F) of the lens group. FIG. 3 is a graphic diagram showing a narrow beam pattern of the lens group; and FIG. 4 is a graphic diagram showing a wide beam pattern of the objective lens of the lens group over the entire image plane.

Figure 4:
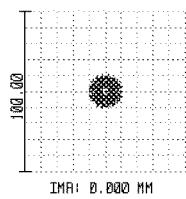
FIG. 4 is a graphic diagram showing a wide beam pattern of the objective lens of the lens group over the entire image plane.
Figure 4:
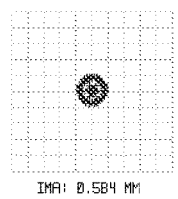
Figure 4:
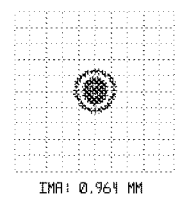
Figure 4:
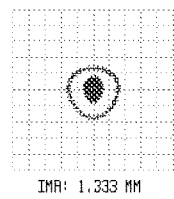
Figure 4:
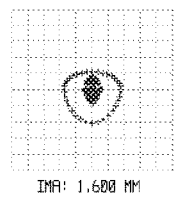
Figure 4:
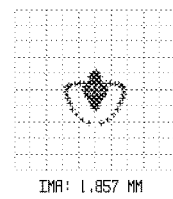

As can be seen from FIG. 2 to FIG. 4, the diameter of the circle in the whole field of view Φ≤10 μm. The distortion is ideal, the quality of the narrow beam basically matches with the wide beam, and phase quality is uniform. The imaging quality of the center and the margin are the same, the quality requirements of the thermal imaging is obtained.

The lens group can be received in a barrel, thus forming a far infrared imaging objective lens. The overall length of the objective lens is 5.8 mm. The pupil diameter was 1 mm.

The far infrared imaging objective lens can be used in a far infrared detector. A thermal receiver is located at a focus plane of the objective lens. Light emitted from a far infrared light source is focused by the objective lens and is received by the thermal receiver, thus implementing the far infrared detection. The thermal receiver can be a thermistor of "Hg.Cd.Te" of ¼". The material of Hg.Cd.Te can sense the infrared light of the object in the range of −40° C. to −650° C., and the image of the object can be obtained which has a temperature difference between 0.05° C. to 0.15° C. The resolution ability of the temperature difference imaging is the illuminated object temperature difference, therefore the imaging ability and the temperature resolution are improved.

The foregoing far infrared detector, objective lens, and lens group thereof can detect distant targets by detecting far-infrared light in the night, fog and other environments, thus it can be widely applied to fire control, monitoring, high-voltage line detection and other occasions.

Although the description is illustrated and described herein with reference to certain embodiments, the description is not intended to be limited to the details shown. Modifications may be made in the details within the scope and range equivalents of the claims.

What is claimed is:

1. A far infrared imaging lens group, comprising a first lens and a second lens arranged in sequence along a principal axis, wherein the first lens comprises a first surface and a second surface, the first surface has a radius of curvature of 2.4×(1±5%) mm and the second surface having a radius of curvature of 2×(1±5%) mm;

the second lens comprises a third surface and a fourth surface, the third surface has a radius of curvature of 50×(1±5%) mm and the fourth surface having a radius of curvature of 60×(1±5%) mm;

wherein the first surface, the second surface, the third surface, and the fourth surface are successively arranged; the first surface, the second surface, and the third surface are convex surfaces facing an object side, the fourth surface is a convex surface facing an image side.

2. The far infrared imaging lens group according to claim 1, wherein an interval between the second surface and the third surface is 1×(1±5%) mm.

3. The far infrared imaging lens group according to claim 1, wherein a central thickness of the first lens is 0.8×(1±5%) mm.

4. The far infrared imaging lens group according to claim 1, wherein a central thickness of the second lens is 0.8×(1±5%) mm.

5. The far infrared imaging lens group according to claim 1, wherein the first lens and the second lens are made of ZnSe.

6. A far infrared imaging objective lens, comprising a barrel and a lens group according to claim 1, wherein the barrel is configured to accommodate the lens group.

7. The far infrared imaging objective lens according to claim 6, wherein the barrel has a length of 5.8 mm.

8. A far infrared detector, comprising the far infrared imaging objective lens of claim 6 and a thermal receiver, wherein the thermal receiver is located at a focus of the objective lens.

9. The far infrared detector according to claim 8, wherein the thermal receiver is a thermistor of HgCdTe.

* * * * *